(12) United States Patent  
Dona

(10) Patent No.: US 11,428,957 B2  
(45) Date of Patent: Aug. 30, 2022

(54) SPECTACLES

(71) Applicant: SAFILO SOCIETÀ AZIONARIA FABBRICA ITALIANA LAVORAZIONE OCCHIALI S.P.A., Padua (IT)

(72) Inventor: Cristian Dona, Padua (IT)

(73) Assignee: SAFILO—SOCIETA AZIONARIA FABBRICA ITALIANA LAVORAZIONE OCCHIALI S.P.A., Padua (IT)

( * ) Notice: Subject to any disclaimer, the term of this patent is extended or adjusted under 35 U.S.C. 154(b) by 348 days.

(21) Appl. No.: 16/625,382

(22) PCT Filed: Jun. 22, 2018

(86) PCT No.: PCT/EP2018/066779  
§ 371 (c)(1),  
(2) Date: Dec. 20, 2019

(87) PCT Pub. No.: WO2019/007711  
PCT Pub. Date: Jan. 10, 2019

(65) Prior Publication Data  
US 2021/0149223 A1    May 20, 2021

(30) Foreign Application Priority Data  
Jul. 3, 2017    (IT) .................... IT102017000074265

(51) Int. Cl.  
*G02C 11/02*    (2006.01)  
*G02C 5/14*    (2006.01)  
*G02C 5/22*    (2006.01)

(52) U.S. Cl.  
CPC ................ *G02C 11/02* (2013.01); *G02C 5/14* (2013.01); *G02C 5/22* (2013.01); *G02C 2200/26* (2013.01)

(58) Field of Classification Search  
CPC . G02C 11/02; G02C 5/14; G02C 5/22; G02C 2200/26; G02C 2200/30; G02C 3/04  
(Continued)

(56) References Cited

U.S. PATENT DOCUMENTS 5,739,891 A    4/1998  Wei  
7,677,722 B1    3/2010  Mednick et al.  
(Continued)

FOREIGN PATENT DOCUMENTS

DE          20115831 U1    12/2001  
FR            1162365 A      9/1958  
WO        2013124603 A1     8/2013

*Primary Examiner* — Tuyen Tra  
(74) *Attorney, Agent, or Firm* — Volpe Koenig

(57) ABSTRACT

A pair of spectacles includes a front assembly mount and a pair of arms which extend from respective opposing lateral lugs of the front mount, there being defined on each arm an internal lateral flank, which is directed towards the head with the spectacles being worn, and an opposing external lateral flank. The pair of spectacles also includes on at least one of the arms a respective support element, secured to the external flank of the arm in the region of a portion of the arm near a respective lug for articulation to the mount and which extends in the direction of longitudinal development of the arm behind the external flank and with a spacing from the external flank of the arm, the support carrying a surface, which is visible from the outer side with the spectacles being worn, configured to be decorated or to support decorative patterns.

5 Claims, 4 Drawing Sheets

(58) Field of Classification Search
    USPC .................................................. 351/41, 51
    See application file for complete search history.

(56) References Cited

U.S. PATENT DOCUMENTS

2002/0021405 A1    2/2002   Fukai
2005/0225716 A1   10/2005   Kacavenda

SPECTACLES

TECHNICAL FIELD

The present invention relates to spectacles having the features set out in the preamble of the main claim 1.

TECHNOLOGICAL BACKGROUND

In the field of eyewear, it is well known to use the surfaces of the lateral arms of the spectacles, and in particular the surfaces of the outer flanks of the arms which remain in view with the spectacles being worn, for applying decorative patterns or embellishments in general (for example, logos or specific decorative shapes).

If, however, the person wearing spectacles of conventional type wishes to cover his/her head with a scarf or with a veil or headscarf which surrounds the facial profile, it is inevitable that the lateral arms remain covered either partially or for the most part of the length thereof by the head covering worn, with the result that the decorations which involve the arm cannot be seen.

DESCRIPTION OF THE INVENTION

A main object of the invention is to provide a pair of spectacles which is structurally and functionally configured to overcome the limits set out with reference to the cited prior art.

This object and other objects which will be set out below are achieved by the invention by means of a pair of spectacles constructed according to the appended claims.

BRIEF DESCRIPTION OF THE DRAWINGS

The features and advantages of the invention will be better appreciated from the following detailed description of some preferred embodiments which are illustrated by way of non-limiting example with reference to the appended drawings, in which.

PREFERRED EMBODIMENTS OF THE INVENTION

Figure 1:
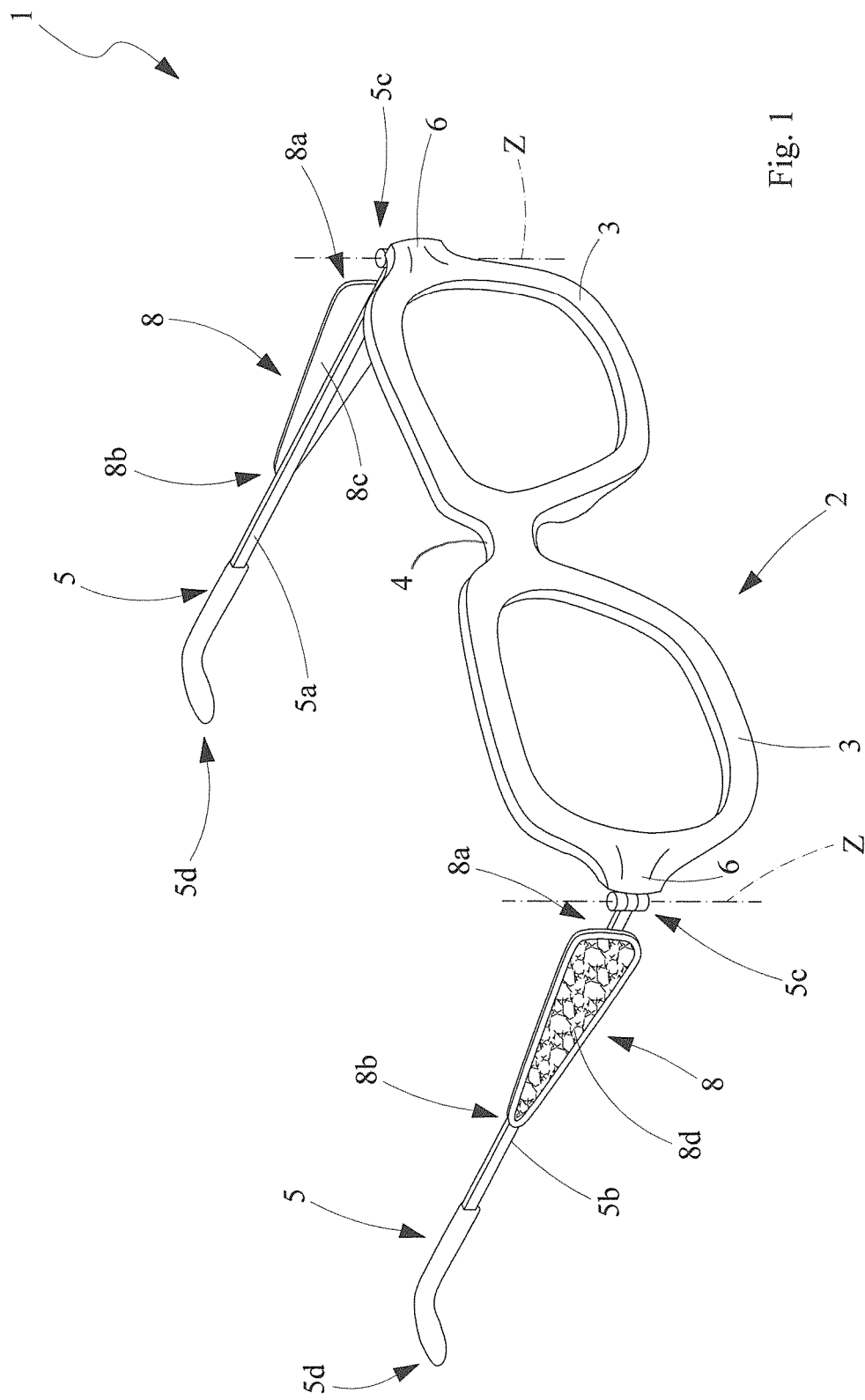
FIG. 1 is a perspective view of a first embodiment of spectacles constructed according to the present invention.
Figure 2:
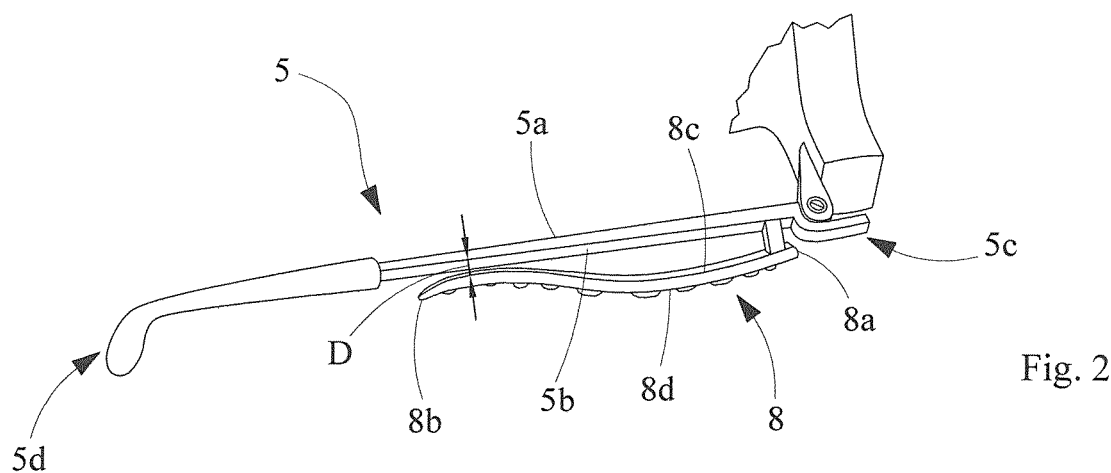
FIG. 2 is a partial plan view of a specific portion of the spectacles of FIG. 1.
Figure 3:
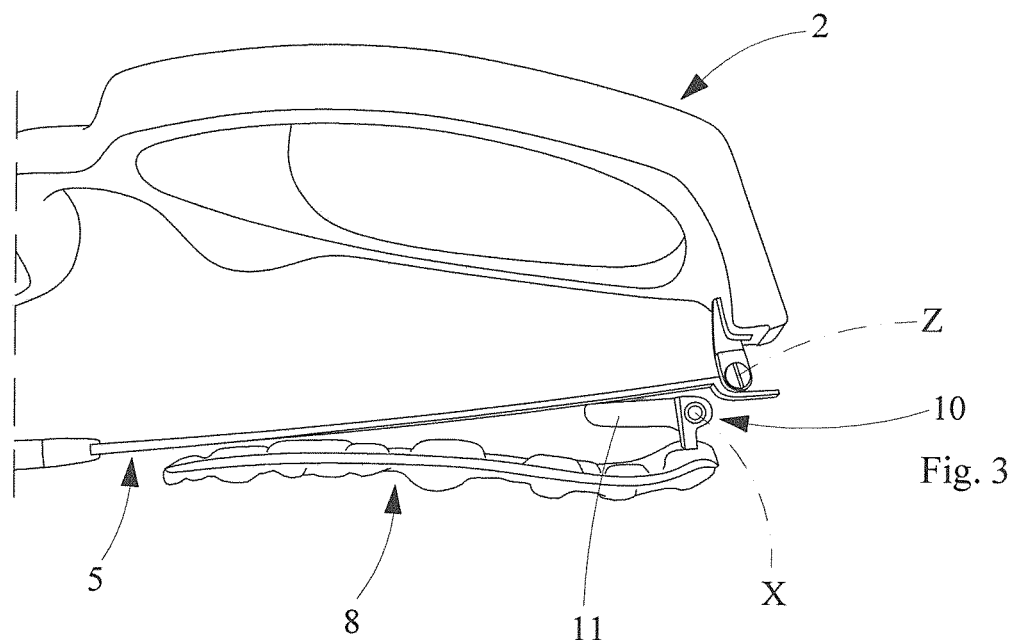
FIG. 3 is a partial view of the specific portion of FIG. 2 in a second embodiment shown in an operating condition.
Figure 4:
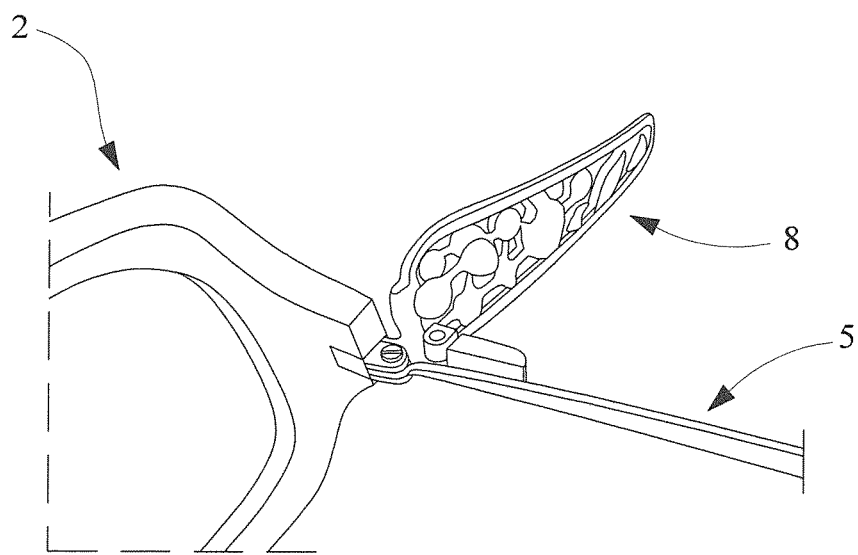
FIG. 4 is a view corresponding to the one of FIG. 3 with the specific portion shown in a non-operating condition.

Initially with reference to FIGS. 1 to 4, there are generally designated 1 a pair of spectacles constructed according to the invention.

The spectacles 1 comprise a frame having a front mount 2 which carries lens-carrying rims 3 which are centrally connected by a bridge 4 and a pair of lateral arms 5. The arms are articulated to respective lateral lugs 6 of the front mount 2 by means of hinge type devices 7, the hinge axis of which is designated Z.

There are defined on each arm 5 an internal lateral flank 5a which is directed towards the head with the spectacles being worn and an opposing external lateral flank 5b, the flanks extending from a first end 5c of the arm, which is intended for the articulation with respect to the corresponding lug 6, as far as a second longitudinally opposite end 5d of the arm.

According to the invention, the spectacles comprise, on each arm 5, a respective support element 8 which is secured to the external flank 5b of the corresponding arm, in the region of a portion of the arm near the end 5c directed towards the respective articulation lug 6.

As a result of the structural identity thereof, only one of the support elements 8 will be described in detail below.

The support element 8 has an end 8a, in the region of which it is secured to the external flank 5b of the arm, and extends from the end 8a in the direction of longitudinal development of the arm, remaining behind the arm itself and with a predetermined spacing from the external flank 5b, in order to terminate at an opposite end 8b thereof. The support element 8 therefore has a main dimension in the direction of longitudinal extent between the ends 8a, 8b and the longitudinal dimension involves a portion of the longitudinal dimension of the arm, as will be clearly appreciated from the Figures.

The spacing, designated D in the Figures, between the arm and the support may vary in the direction of longitudinal extent of the support and may take on a minimum value in the region of the end 8b of the support.

Preferably, the support element 8 has a formation of reduced transverse thickness which is defined between a pair of opposite surfaces 8c, 8d. The surface 8c extends so as to be directed towards the external flank 5b of the arm while the surface 8d extends at the opposite side, therefore remaining visible from the outer side with the spectacles being worn. The surface 8d is advantageously provided to be decorated or to support decorative patterns.

Figure 7:
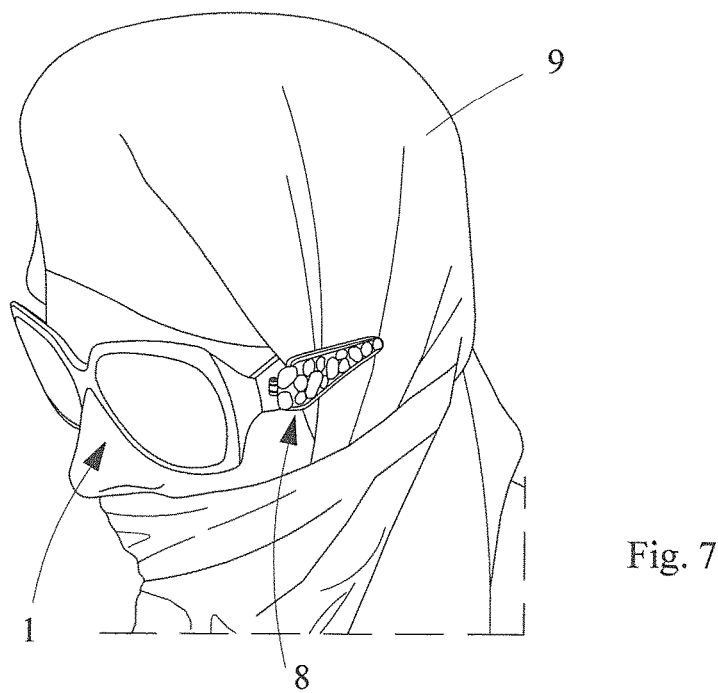
FIG. 7 is a perspective view of the spectacles of FIG. 3 shown being worn.

With particular reference to FIG. 7, if the spectacles are used in conjunction with an item of headgear 9, for example, in the form of a scarf or veil or headscarf, which extends so as to cover the head, wrapping round the contour of the facial profile, the fabric flaps of the headgear can be organized in the region of the lateral arms so as to remain interposed in the space which is defined between the external flank 5b of each arm and the internal surface 8c of the corresponding support 8 facing it. In this manner, the external surface 8d of the support remains in view above the flaps of the headgear, thereby making the decoration provided on the support visible.

Furthermore, as a result of the reduced spacing D provided between the external flank 5b of the arm and the support 8, the fabric flaps of the headgear 9 can remain positioned and retained in a stable manner between each support element 8 and the corresponding arm 5.

The surface 8d of the support element can be configured in terms of desired shape, profile, curvature in order to improve the aesthetic/decorative effect thereof.

Merely by way of example, as shown in the Figures, the surface 8d of the support can be decorated with stones, gems or rhinestones, and has a profile whose contour tapers from the end 8a in the direction of the opposite end 8b.

In one embodiment, the support element 8 is mounted in an articulated manner on the corresponding arm 5 and, for this purpose, there are provided hinge type articulation means 10 so that the support is rotatably movable, about the axis of the hinge, designated X, between a closed position (FIG. 3), in which the support extends near the arm behind the external flank 5b and an open position (FIG. 4), in which the support is moved away from the arm.

The hinge type axes Z and X of the arm on the lug and of the support on the arm, respectively, are advantageously directed parallel with each other.

In an embodiment, the hinge 10 may be of the conventional type, for example, of the type involving a screw type pin, and may further be characterized by a predetermined degree of "friction action", that is to say, bringing about a friction force during rotation, which is sufficiently high for the support element not to move with ease (for example, accidentally in the event of being shaken or bumped) from the closed position.

In another embodiment, there is provision for the hinge type articulation means of the support on the arm to comprise resilient return means for the support 8 towards the closed condition. To this end, the hinge 10 may be configured as a resilient hinge, substantially of the type conventionally applied to the resilient hinge mechanisms of the arms.

Figure 5:
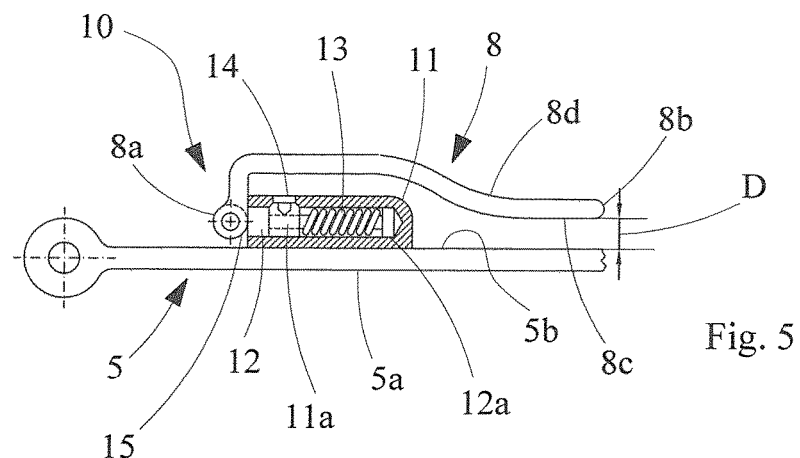
FIGS. 5 and 6 are cross-sections drawn to an enlarged scale of a detail of the specific portion of FIG. 4 illustrated in an operating and non-operating condition, respectively.
Figure 6:
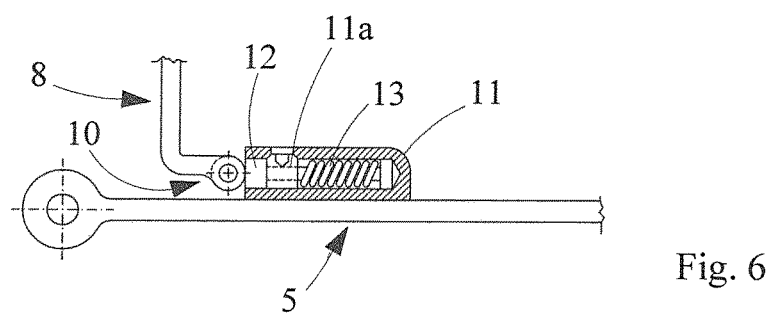
Figure 6A:
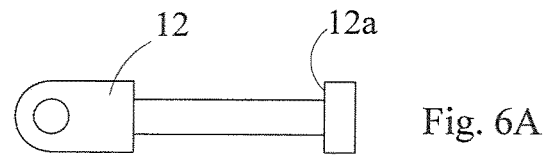
FIG. 6A is a side view from above and to an enlarged scale of a component of the specific portion of FIGS. 5 and 6.

A preferred form of such a mechanism is illustrated in FIGS. 5 and 6 and provides for a box-shaped cover 11 (for example, welded to the external flank of the arm) for containing a tie-rod 12 which is hinged to the end 8a of the support (the end 8a is provided with eyelets which are suitable for being connected in a hinge-like manner to a corresponding end eyelet of the tie-rod) and to which there is fitted a helical spring 13 which is active between an abutment 12a of the tie-rod and an abutment block 11a which is fixedly joined to the cover 11. The block 11a is passed through by a cylindrical recess which is orientated parallel with the longitudinal axis of the tie-rod, inside which the tie-rod 12 with a sliding type connection is inserted. The block is fixed relative to the cover by means of a screw or pin 14 which extends through the cover itself and which has the function of limiting the excursion of the tie-rod. The tie-rod is shown to an enlarged scale in FIG. 6A.

The end 8a of the support 8 is further advantageously formed with a cam-like profile 15, which allows stable positioning of the support in the closed and open positions, but which brings about a rapid movement towards the closed position (resiliently urged by the spring) when it is moved slightly from the open position towards the closed condition or a rapid movement towards the open position (resiliently urged by the spring) when it is moved slightly from the closed position towards the open condition.

In an embodiment of the hinge 10, whether or not of the resilient type set out above, there is provision for means for limiting the angle of rotation of the support 8 relative to the corresponding arm 5 to be provided between the elements of the hinge.

Figure 8:
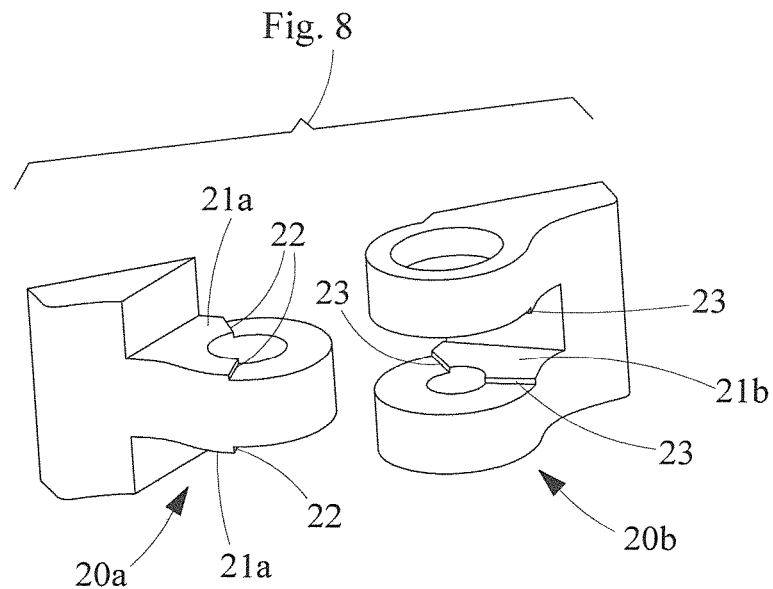
FIG. 8 is a perspective view with separated portions of a hinge which is intended for another embodiment of spectacles according to the invention.
Figure 9:
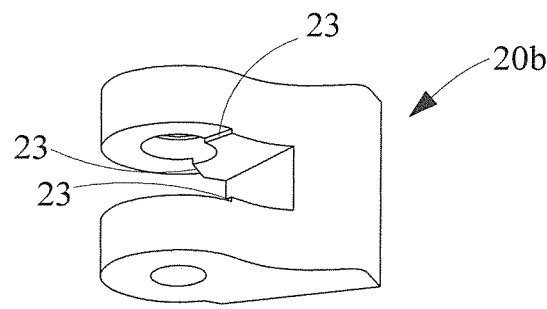
FIG. 9 is a perspective view of one of the hinge elements of FIG. 8.
Figure 10:
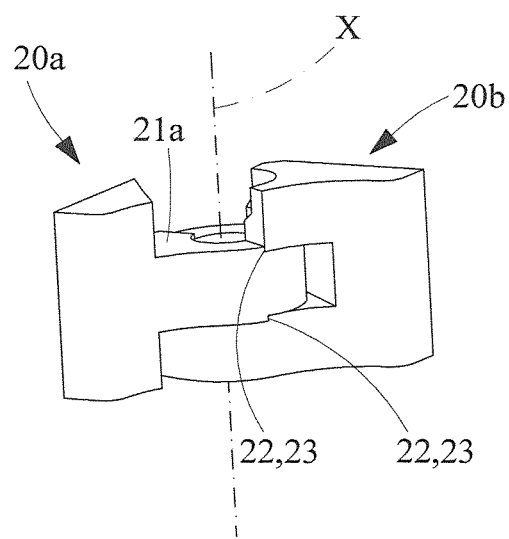
FIG. 10 is a partially sectioned view of the hinge of FIG. 8 with hinge elements being assembled.

With reference to FIGS. 8 to 10, there are designated 20a and 20b the elements of the hinge 10 which are connected to each other about the hinge type axis X. Each of the hinge elements may alternatively be provided either at the end of the support 8 or on the flank of the arm 5 (or in the case of a resilient hinge at the end of the tie-rod 12), there being designated 20a the male element with a single eyelet, which is intended to be connected to the other female element 20b which has a pair of coaxial eyelets which are spaced apart.

There is designated 21a a circular surface sector of the eyelet of the element 20a, which extends in a raised manner with respect to the remaining portion of the eyelet. The raised sector 21a is preferably formed on each of the surface faces which are axially opposite the eyelet of the element 20a.

Therefore, there remain defined between the raised surface of the circular sector 21a and the remaining portion of the sector a pair of stepped abutment surfaces which are designated 22. A similar raised circular sector 21b extends from each of the surface faces which face each other of the pair of eyelets of the female hinge element 20b, with corresponding stepped abutment surfaces 23 being defined. The surfaces 22, 23 of the circular sectors of the male element 20a and female element 20b, respectively, of the hinge 10 are intended, during the rotation of the hinge, to engage with each other in abutment so as to limit the relative rotation between the hinge elements which are connected to each other, the extent of the circular sectors 21a, 21b determining the extent of the relative angular rotation allowed for the hinge elements. In this manner, by selecting the angular extent of the circular sectors 21a, 21b in an advantageous manner, it is possible to obtain a predetermined limitation of the angular rotation travel allowed for the support 8, relative to the arm, between the open and closed positions. Therefore, it is possible to predetermine the relative position between the support and the arm both in the open position and in the closed position, by further predetermining in the closed position the extent of the spacing D between the support and the arm.

The invention thereby achieves the predetermined objectives, affording the advantages set out with respect to the known solutions.

A first advantage is that, as a result of the provision of spectacles with a support element according to the invention, if the spectacles are combined with an item of headgear which wraps around the head and so as to cover the lateral arms, the support allows the display and visibility of the decorations provided on the support.

Another advantage is that the support can act as a retention element for the fabric of the headgear, because the support in the closed position can stably fix and retain the folds of the fabric (inserted or accommodated between the arm and the support) in order to impose on the fabric the desired shape or in order to adapt the dimensions thereof to the face or the head of the person wearing it.

In this regard, there is provision, in the closed position, for the support element to be arranged very near, with reduced spacing, the external flank of the arm so that the space defined by this reduced spacing is sufficient to be able to contain the modest thickness of the veil flap and is still capable of blocking the veil itself stably and firmly.

In this case, the open position of the support, with the same spacing from the arm, may be configured as a transitional condition having the function of readily and rapidly releasing the veil flap from the frame if the user needs to do so.

The invention claimed is:

1. A pair of spectacles comprising a front assembly mount (2) and a pair of arms (5) which extend from respective opposing lateral lugs (6) of the front mount, there being defined on each arm an internal lateral flank (5a), which is directed towards the head with the spectacles being worn, and an opposing external lateral flank (5b), wherein the spectacles comprise on at least one of the arms (5) a respective support element (8), mounted in an articulated manner on a corresponding arm (5), which is secured to the external flank (5*b*) of the arm in the region of a portion of the arm near the respective lug (6) for articulation to the mount (2) and which extends in the direction of longitudinal development of the arm behind the external flank (5*b*) and with a predetermined spacing from the external flank of the arm, the support element (8) carrying a surface (8*d*), which is visible from the outer side with the spectacles being worn and which is configured to be decorated or to support decorative patterns, the spectacles further comprising a hinge (10) between the support element (8) and the corresponding arm (5) so that the support element can be rotatably moved about the axis of the hinge (10) between a closed position, in which the element (8) extends near the arm behind the external flank (5*b*) of the arm, and an open position, in which the element (8) is moved away from the arm, the hinge (10) of the support element (8) with the arm comprises resilient return means for the support element (8) towards the closed position, the resilient return means comprise a box-shaped cover (11) for containing a tie-rod (12), to which there is fitted a spring (13) which is active between the tie-rod and an abutment surface of the cover, the box-shaped cover (11) being fixedly joined to the arm (5) and the support element (8) being articulated in a hinge-like manner with one end of the tie-rod (12) projecting at the outer side of the cover (11).

2. The pair of spectacles according to claim 1, wherein an articulation axis of the hinge (10) between the support element (8) and the arm (5) is directed parallel with the articulation axis of the arm (5) with the lug (6) of the front mount (2) of the pair of spectacles.

3. The pair of spectacles according to claim 1, further comprising means for limiting the angle of rotation of the support element (8) about the articulation axis of the hinge (10) with the arm.

4. The pair of spectacles according to claim 1, wherein an end (8*a*) of the support element (8) which is connected in a hinge-like manner to the tie-rod (12) has a cam-like profile (15) which cooperates with a surface of the cover (11) so that the support (8) remains stably retained in the closed position and is moved with a resilient snap-fit movement towards the open position once an intermediate position between the open and closed positions has been reached and overcome, or is moved with a rapid movement towards the open position in a manner resiliently urged by the spring (13) when it is moved slightly from the closed position towards the open condition.

5. A pair of spectacles comprising a front assembly mount (2) and a pair of arms (5) which extend from respective opposing lateral lugs (6) of the front mount, there being defined on each arm an internal lateral flank (5*a*), which is directed towards the head with the spectacles being worn, and an opposing external lateral flank (5*b*), wherein the spectacles comprise on at least one of the arms (5) a respective support element (8), mounted in an articulated manner on a corresponding arm (5), which is secured to the external flank (5*b*) of the arm in the region of a portion of the arm near the respective lug (6) for articulation to the mount (2) and which extends in the direction of longitudinal development of the arm behind the external flank (5*b*) and with a predetermined spacing from the external flank of the arm, the support element (8) carrying a surface (8*d*), which is visible from the outer side with the spectacles being worn and which is configured to be decorated or to support decorative patterns, the spectacles further comprising a hinge (10) between the support element (8) and the corresponding arm (5) so that the support element can be rotatably moved about the axis of the hinge (10) between a closed position, in which the element (8) extends near the arm behind the external flank (5*b*) of the arm, and an open position, in which the element (8) is moved away from the arm, further comprising means for limiting the angle of rotation of the support element (8) about the articulation axis of the hinge (10) with the arm, wherein the means for limiting the angle of rotation in the hinge type connection of the support to the arm comprise surfaces (22, 23) which are capable of reciprocal abutment and which are provided on predetermined circular sectors (21*a*, 21*b*) of faces of respective eyelet-like formations which are formed on the support (8) and on the arm (5), the eyelet-like formations defining the elements of the hinge (10) which are rotatably connected about the hinge type axis.

\* \* \* \* \*